(12) United States Patent
Hasegawa

(10) Patent No.: US 7,054,352 B2
(45) Date of Patent: May 30, 2006

(54) CDMA MOBILE TELEPHONE

(75) Inventor: Osamu Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 900 days.

(21) Appl. No.: 09/726,722

(22) Filed: Nov. 30, 2000

(65) Prior Publication Data

US 2001/0041536 A1 Nov. 15, 2001

(30) Foreign Application Priority Data

Nov. 30, 1999 (JP) ............................. 1999/338916

(51) Int. Cl.
*H04B 1/69* (2006.01)

(52) U.S. Cl. ...................... 375/147; 375/148; 375/208; 375/344; 455/434; 455/413; 455/441

(58) Field of Classification Search ................ 375/147, 375/148, 344, 208; 455/434, 67, 413, 441
See application file for complete search history.

(56) References Cited

U.S. PATENT DOCUMENTS

| | | | | |
|---|---|---|---|---|
| 5,950,131 | A * | 9/1999 | Vilmur ........................ | 455/434 |
| 6,061,021 | A | 5/2000 | Zibell | |
| 6,108,532 | A * | 8/2000 | Matsuda et al. ............. | 455/413 |
| 6,373,882 | B1 * | 4/2002 | Atarius et al. ............... | 375/148 |
| 6,813,309 | B1 * | 11/2004 | Ogino ........................ | 375/148 |

FOREIGN PATENT DOCUMENTS

| | | |
|---|---|---|
| DE | 198 43 664 A1 | 4/1999 |
| EP | 1 052 820 A1 | 11/2000 |
| GB | 2355366 A | 4/2001 |
| JP | 7-74726 | 3/1995 |
| JP | 9-307953 | 11/1997 |
| JP | 11-98071 | 4/1999 |
| JP | 11-234756 | 8/1999 |
| JP | 11-239381 | 8/1999 |
| JP | 11-252633 | 9/1999 |
| WO | WO 01/17185 A1 | 3/2001 |

OTHER PUBLICATIONS

Hsuan; Method and System For Tracking and Correcting Timing Errors in Communication Systems; Pub. No.: US 2003/0202488 A1; Pub. Date: Oct. 30, 2003.*

* cited by examiner

*Primary Examiner*—Stephen Chin
*Assistant Examiner*—Eva Zheng
(74) *Attorney, Agent, or Firm*—Scully, Scott, Murphy & Presser, P.C.

(57) ABSTRACT

A CDMA mobile telephone allowing the drive mode to be automatically set and canceled without increasing the amount of hardware is disclosed. A frequency offset for each of N fingers is detected from despread data which are obtained by despreading received spectrum-spread data of M branches. Based on the detected N frequency offsets, it is determined whether the mobile telephone is moving at speeds higher than a predetermined speed. An operation mode of the mobile telephone switches between a drive mode and a normal mode depending on whether the mobile telephone is moving at speeds higher than the predetermined speed.

16 Claims, 7 Drawing Sheets

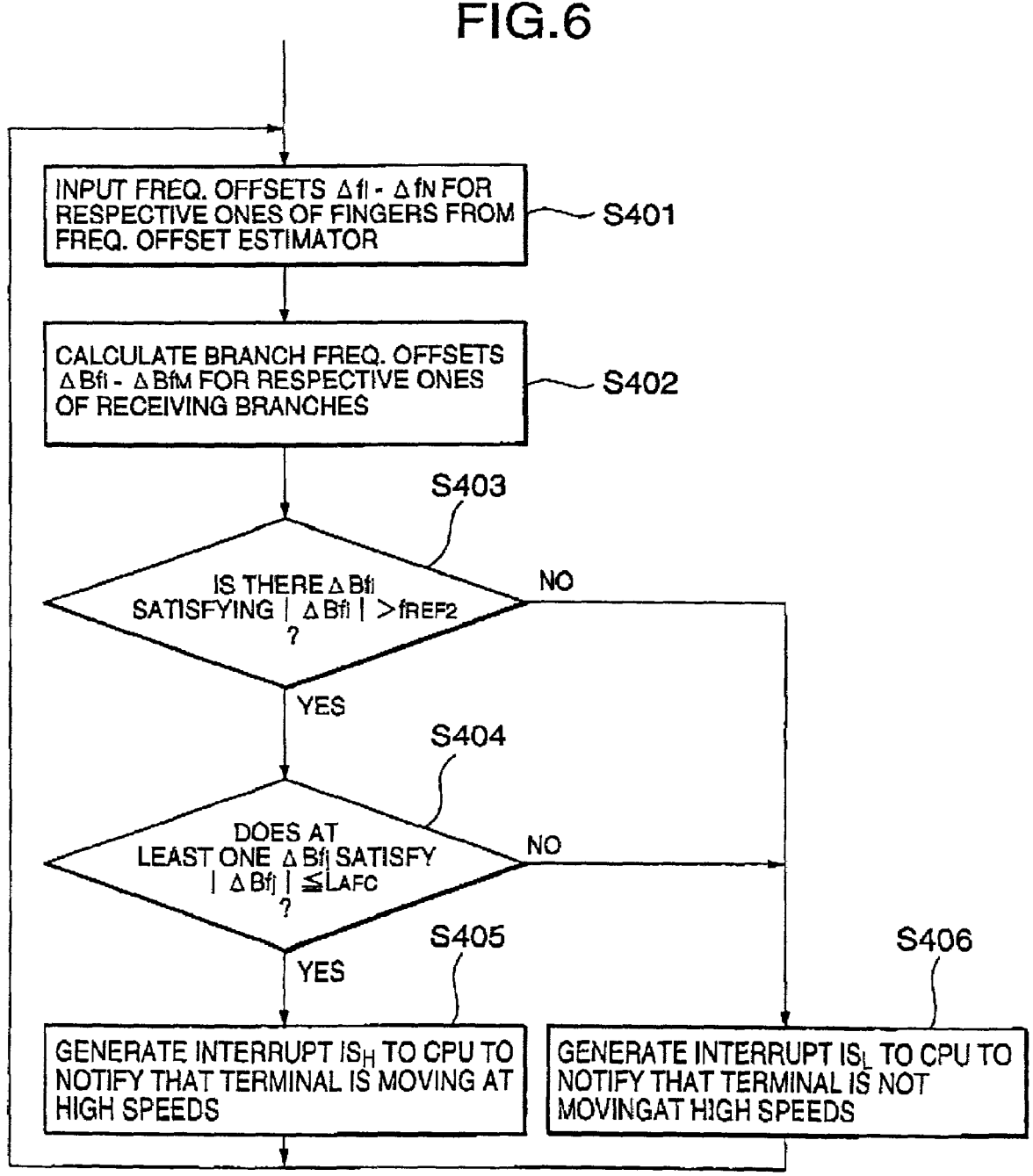

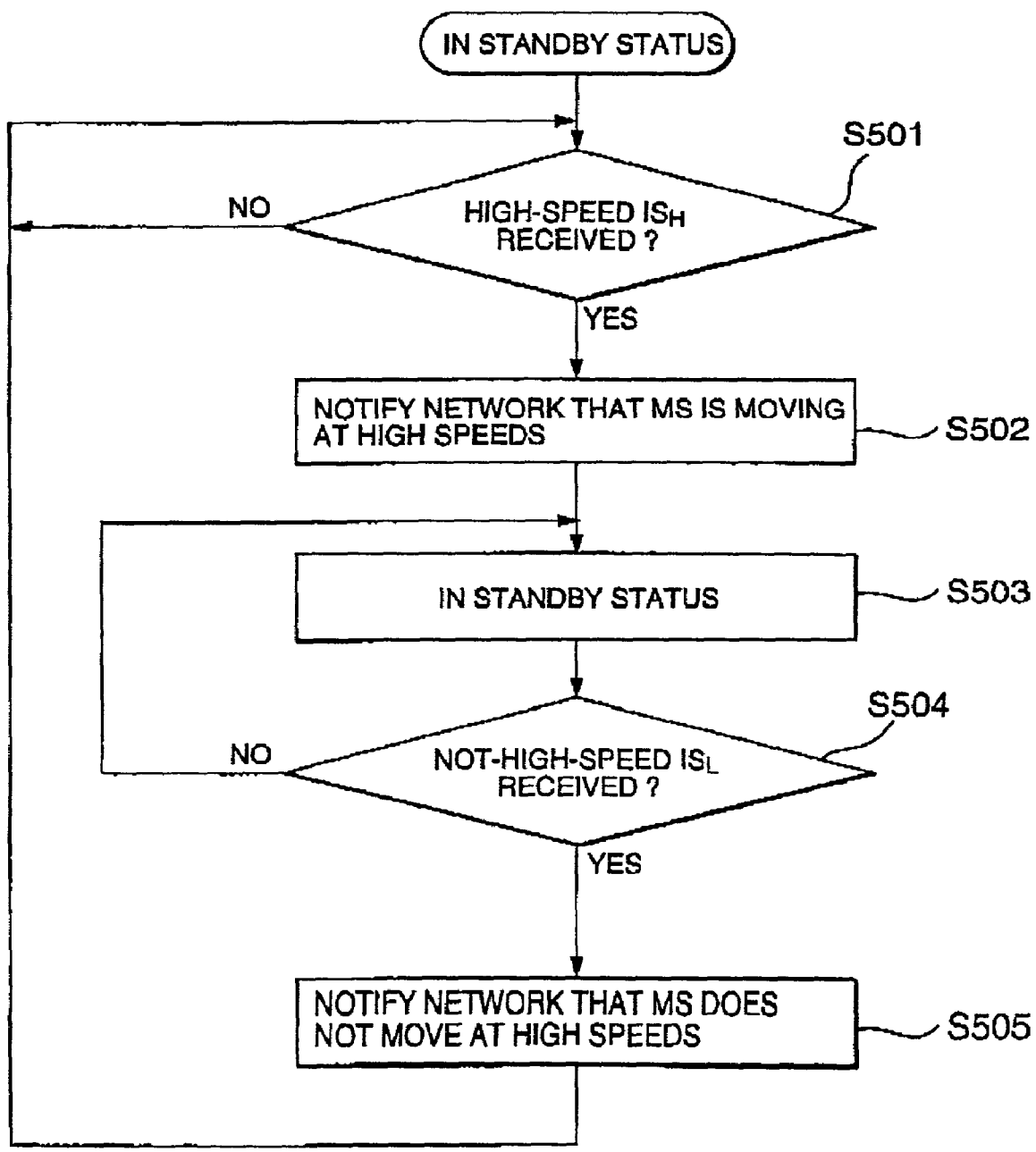

CDMA MOBILE TELEPHONE

BACKGROUND OF THE INVENTION

1. Field of the Invention

The present invention relates to a CDMA (Code Division Multiple Access) mobile communications system, and in particular to a CDMA mobile telephone having a function of determining whether the CDMA mobile telephone is moving.

2. Description of the Related Art

There is a growing awareness of dangers that a driver takes a mobile telephone while driving a car or is surprised with a sudden beep. To avoid such a dangerous situation, there have been proposed several mobile telephones having an automatic drive-mode setting function.

In Japanese Patent Application Unexamined Publication No. 11-234756, for example, a mobile telephone Is provided with a received signal level detector and a fading decision section, which are used to detect a period of fading occurrence. When the detected fading period is smaller than a predetermined time period, a controller determines that the mobile telephone is on the move and sets the mobile telephone to an automatic answering mode in which, when an incoming call occurs, a response message is automatically sent to the caller without starting a ringer.

In the field of CDMA mobile communications, there has been disclosed a velocity detecting method using a Doppler frequency calculated based on variations in received signal level or widened frequency band due to fading (see Japanese Patent Application Unexamined Publication No. 11-98071). To calculate the Doppler frequency, a CDMA mobile terminal is provided with a circuit for counting the number of times a received signal level has changed across an average level or a circuit for measuring the amount of widened frequency band.

However, a conventional mobile station needs an extra circuit for detecting fading occurrence, variations in received signal level, or the amount of widened frequency band, resulting in increased amount of hardware.

SUMMARY OF THE INVENTION

An object of the present Invention is to provide a CDMA mobile telephone allowing the drive mode to be automatically set and canceled without Increasing the amount of hardware.

According to the present invention, a mobile telephone apparatus operable in a CDMA communications system includes: a despreading circuit for despreading received spectrum-spread data of a plurality of branches to produce despread data each corresponding a plurality of fingers; a frequency offset detector for detecting a frequency off set for each of the fingers from the despread data; a movement determiner for determining whether the mobile telephone is moving at speeds higher than a predetermined speed, based on frequency offsets received from the frequency offset detector: and a mode controller for switching an operation mode between a drive mode and a normal mode depending on whether the mobile telephone apparatus is moving at speeds higher than the predetermined speed.

The movement determiner may include a Doppler frequency calculator for calculating Doppler frequencies for respective ones of the branches by combining the frequency offsets for respective ones of the fingers; a first determiner for determining whether there is a pair of Doppler frequencies satisfying a first condition such that the Doppler frequencies are of opposite sign; a second determiner for determining whether the Doppler frequencies satisfy a second condition such that an absolute value of each of the Doppler frequencies is not smaller than a first reference value; and a determination controller for determining that the mobile telephone apparatus is moving at speeds higher than the predetermined speed when a pair of Doppler frequencies satisfying the first and second conditions exists.

The determination controller may output a first interrupt signal to the mode controller when the pair of Doppler frequencies satisfying the first and second conditions exist and outputs a second interrupt signal to the mode controller when a pair of Doppler frequencies satisfying the first and second conditions does not exist, wherein the mode controller sets the mobile telephone apparatus to the drive mode when receiving the first interrupt signal and sets the mobile telephone apparatus to the normal mode when receiving the second interrupt signal.

The movement determiner may include: a branch frequency offset calculator for calculating branch frequency offsets for respective ones of the branches by combining the frequency offsets for respective ones of the fingers: a first determiner for determining whether there is a branch frequency offset satisfying a first condition such that an absolute value of the branch frequency offset is greater than a second reference value; a second determiner for determining whether there is at least one branch frequency offset satisfying a second condition such that an absolute value of the branch frequency offset is not greater than a maximum correction threshold of AFC (automatic frequency control) operation performed in the mobile telephone apparatus; and a determination controller for determining that the mobile telephone apparatus is moving at speeds higher than the predetermined speed when there are both the branch frequency offset satisfying the first condition and the at least one branch frequency offset satisfying the second condition.

The determination controller may output a first interrupt signal to the mode controller when there are both the branch frequency offset satisfying the first condition and the at least one branch frequency offset satisfying the second condition, and outputs a second interrupt signal to the mode controller when there is neither the branch frequency offset satisfying the first condition nor the at least one branch frequency offset satisfying the second condition, wherein the mode controller sets the mobile telephone apparatus to the drive mode when receiving the first interrupt signal and sets the mobile telephone apparatus to the normal mode when receiving the second interrupt signal.

The mobile telephone apparatus may further include a display controller for controlling a display device when the mobile telephone apparatus is moving at speeds higher than the predetermined speed such that a message Indicating that the mobile telephone apparatus is moving at speeds higher than the predetermined speed is displayed on the display device.

The mobile telephone apparatus may further include: a voice message generator for generating a predetermined voice message when an incoming call occurs during the drive mode; and a communication controller for transmitting the predetermined voice message to a caller.

The mobile telephone apparatus may further include: a communication controller for transmitting a network system a drive-mode message indicating that the mobile telephone apparatus is moving at speeds higher than the predetermined speed, when the operation mode has been changed to the drive mode, wherein the network system has a voice message system in which, when an incoming call occurs after having received the drive-mode message from the mobile telephone apparatus, the voice message system transmits a predetermined voice message to a caller.

BRIEF DESCRIPTION OF THE DRAWINGS

FIG. 6 is a flow chart showing a movement decision method according to the second embodiment of the present invention; and FIG. 7 is a flow chart showing a drive-mode switch operation in the second embodiment.

DESCRIPTION OF THE PREFERRED EMBODIMENTS

Figure 1:
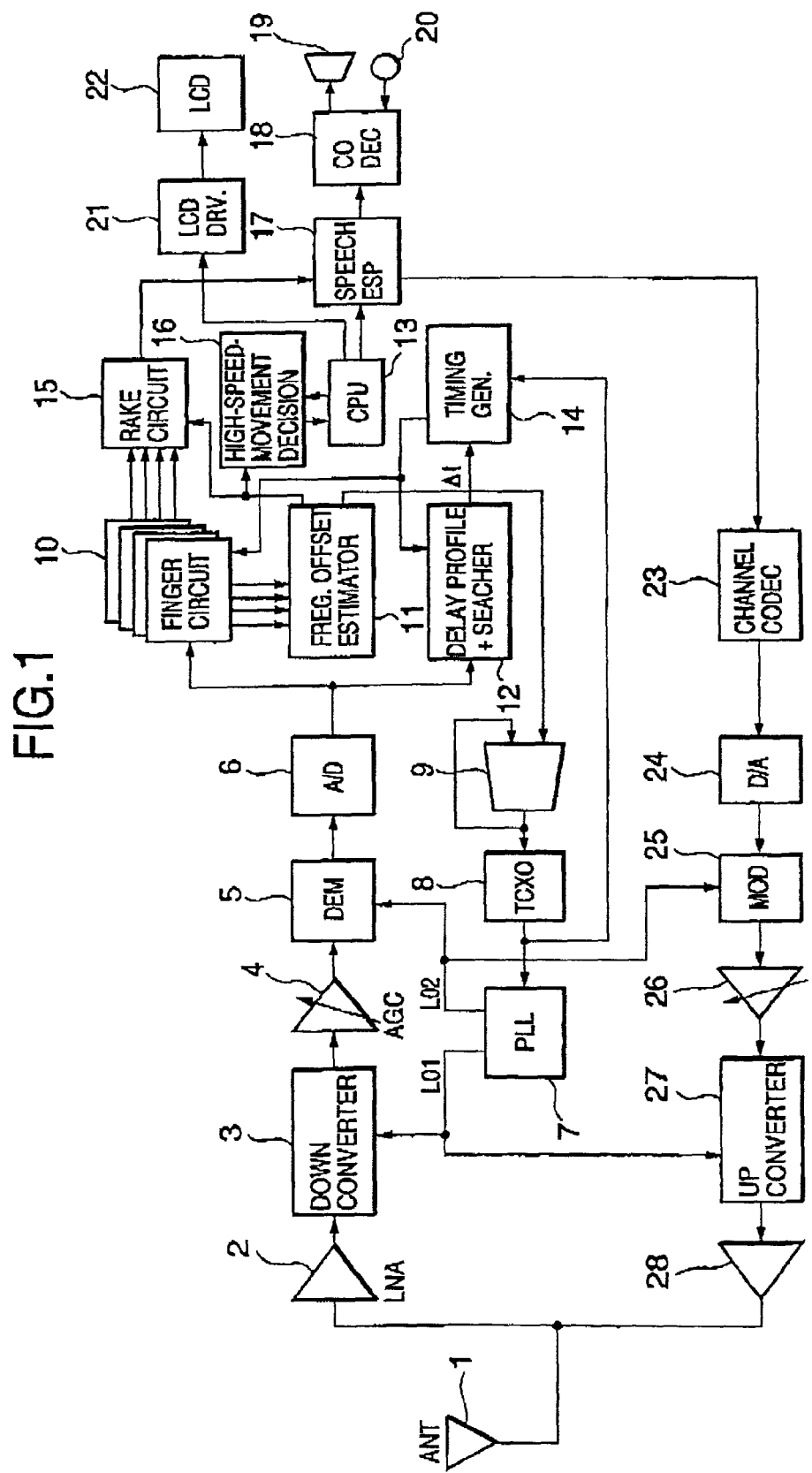
FIG. 1 is a block diagram showing a CDMA mobile telephone according to a first embodiment of the present invention.

Referring to FIG. 1, a CDMA mobile telephone includes a heterodyne radio transceiver. A radio-frequency (RF) signal received at an antenna 1 is amplified by a low-noise amplifier 2 and then is down-converted from RF to intermediate frequency (IF) by a down converter 3 using a first local signal LO1. The IF received signal is amplified by a variable-gain amplifier 4 depending on an automatic gain control signal so that the input level at an analog-to-digital converter 6 is kept constant. The IF received signal is output to a quadrature demodulator (DEM) 5, which uses a second local signal LO2 to demodulate the IF received signal to produce an analog baseband signal. The analog baseband signal is converted by the analog-to-digital converter 6 Into a digital baseband signal.

The first and second local signals LO1 and LO2 are generated by a phase-locked loop circuit 7 receiving a reference oscillation signal from a reference oscillator (here, TCXO) 8. The reference oscillator 8 is a voltage-controlled oscillator having a control terminal connected to the output of an accumulator 9 (which will be described later).

The digital baseband signal is output from the analog-to-digital converter 6 to both a finger circuit 10 and a delay-profile searcher 12. The finger circuit 10 is a RAKE-finger circuit composed of a predetermined number of fingers each including correlators. Each of the fingers in the finger circuit 10 produces despread data from the digital baseband signal based on a frame timing signal received from a timing generator 14. The respective despread data of the finger are output to a frequency offset estimator 11 and a RAKE circuit 15.

The delay-profile searcher 12 produces delay-profile data and an amount of frame-timing correction from the digital baseband signal based on a frame timing signal received from the timing generator 14. The frame-timing correction amount is output to the timing generator 14. The timing generator 14 generates an ideal frame timing signal based on the reference oscillation signal received from the reference oscillator 8 and then produces the frame timing signal by adding the frame-timing correction amount received from the delay-profile searcher 12 to the ideal frame timing signal. The frame timing signal is supplied to the finger circuit 10 and the delay-profile searcher 12. Then, the-profile searcher 12 produces an updated amount of frame-timing correction based on the frame timing signal received from the timing generator 14 and outputs the updated frame-timing correction amount to the timing generator 14. In this manner, the timing generator 14 can supply a precise frame timing signal to the finger circuit 10 and the delay-profile searcher 12 at all times.

The frequency offset estimator 11 calculates a frequency offset for each finger by using known data such as pilot data included in the despread data received from the finger circuit 10. The calculated frequency offset for each finger is output to the RAKE circuit 15 and a high-speed-movement decision section 16. Further, the frequency offset estimator 11 combines the frequency offsets that are weighted taking into account an electric field level and signal-to-noise ratio of a received signal to produce a combined frequency offset, which is output to the accumulator 9. The accumulator 9 adds the combined frequency offset to a current frequency offset to output a frequency control voltage to the reference oscillator 8. In this way, the AFC (Automatic Frequency Control) operation is performed.

The high-speed-movement decision section 16 uses the calculated frequency offset for each finger to determine whether the mobile telephone is moving at high speeds. The high-speed-movement decision section 16 generates an interrupt signal to a micro processor (CPU) 13 so as to notify it whether the mobile telephone is moving at high speeds The details will be described later by referring to FIG. 2.

The RAKE circuit 15 weights the despread data received from the finger circuit 10 taking into account an electric field level and signal-to-noise ratio of a received signal and combines the weighted despread data to produce demodulated data. The demodulated data is output to a speech DSP (digital signal processor) 17, which performs coding/decoding according to a predetermined codec algorithm such as G729. The decoded data is output to a codec 18, which produces an analog voice signal from the decoded data to drive a speaker 19.

On the other hand, an analog voice signal inputted by a microphone 20 is converted to a digital voice signal by the codec 18 and then the digital voice signal is encoded by the speech codec 17. The encoded data is output to a channel codec 23, which performs error-correcting coding and channel control of the encoded data to produce transmission data. The transmission data is converted by a digital-to-analog converter 24 to an analog transmission baseband signal. A modulator 25 modulates the second local oscillation signal LO2 according to the analog transmission baseband signal to produce an IF-band transmission signal. After the IF-band transmission signal is amplified by a variable-gain amplifier 26, it is up-converted by an up converter 27 using the first local oscillation signal LO1 into transmission radio frequency. The transmission RF signal is amplified by a power amplifier 28 before transmitted through the antenna 1.

The mobile telephone is further provided with a liquid crystal display (LCD) device 22, which is driven by a LCD driver 21 under control of the CPU 13.

Figure 2:
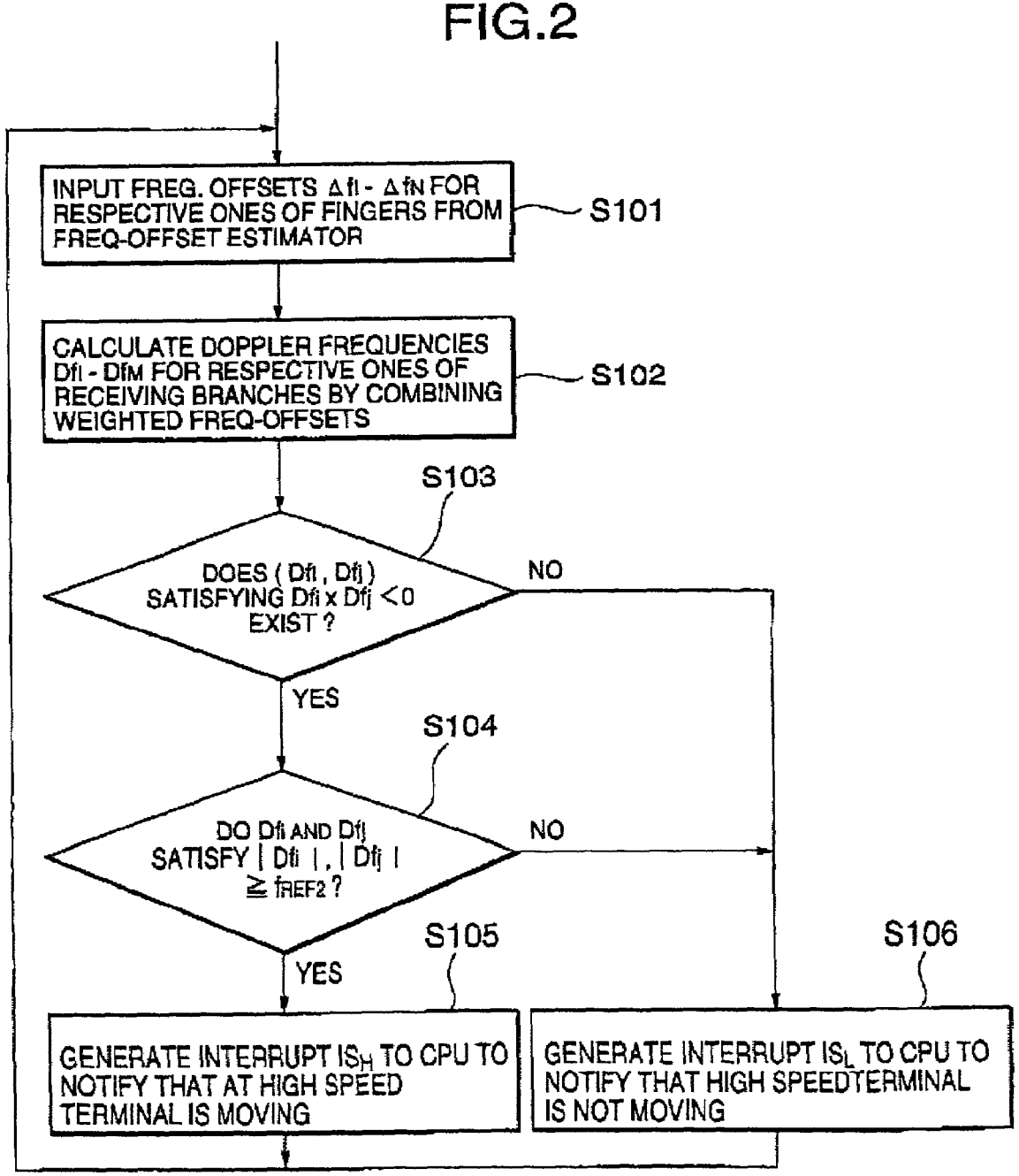
FIG. 2 is a flow chart showing a movement decision method according to the first embodiment of the present invention.

Referring to FIG. 2, the high-speed-movement decision section 16 inputs N frequency offsets $\Delta f_1$–$\Delta f_N$ each corresponding to N fingers from the frequency offset estimator 11 (step S101). Thereafter, the high-speed-movement decision section 16 calculates Doppler frequencies $Df_1$–$Df_M$ for respective ones of the receiving branches by combining the frequency offsets $\Delta f_1$–$\Delta f_N$ which are weighted for respective ones of receiving branches taking into account an electric field level, a signal-to-noise ratio and the like of a received signal (step S102).

Subsequently, it is determined whether there is a pair of Doppler frequencies ($Df_i$, $Df_j$) satisfying $Df_i \times Df_j < 0$ (step S103). In other words, the high-speed-movement decision section 16 searches the Doppler frequencies $Df_1$–$Df_M$ for a pair of Doppler frequencies ($Df_1$, $Df_j$) satisfying that $Df_i$ and $Df_j$ are of opposite sign.

When such a pair of Doppler frequencies ($Df_i$, $Df_j$) is found (YES at step S103), it is further determined whether the absolute values $|Df_1|$ and $|Df_1|$ are equal to or greater than a predetermined reference set value $f_{REF1}$ (step S104). If the absolute values $|Df_1|$ and $|Df_j|$ are not smaller than the predetermined reference set value $f_{REF1}$ (YES at step S104), then the high-speed-movement decision section 16 generates an Interrupt signal $IS_H$ to the CPU 13 to indicate that the mobile telephone is on the move (step S105).

If there is no pair of Doppler frequencies ($Df_i$, $Df_j$) satisfying $Df_1 \times Df_j < 0$ (NO at step S103) or if at least one of the absolute values $|Df_1|$ and $|Df_j|$ is smaller than the predetermined reference set value $f_{REF1}$ (NO at step S104), then the high-speed-movement decision section 16 generates an interrupt signal $IS_L$ to the CPU 13 to Indicate that the mobile telephone stops or does not move at high speeds (step S106).

Figure 3:
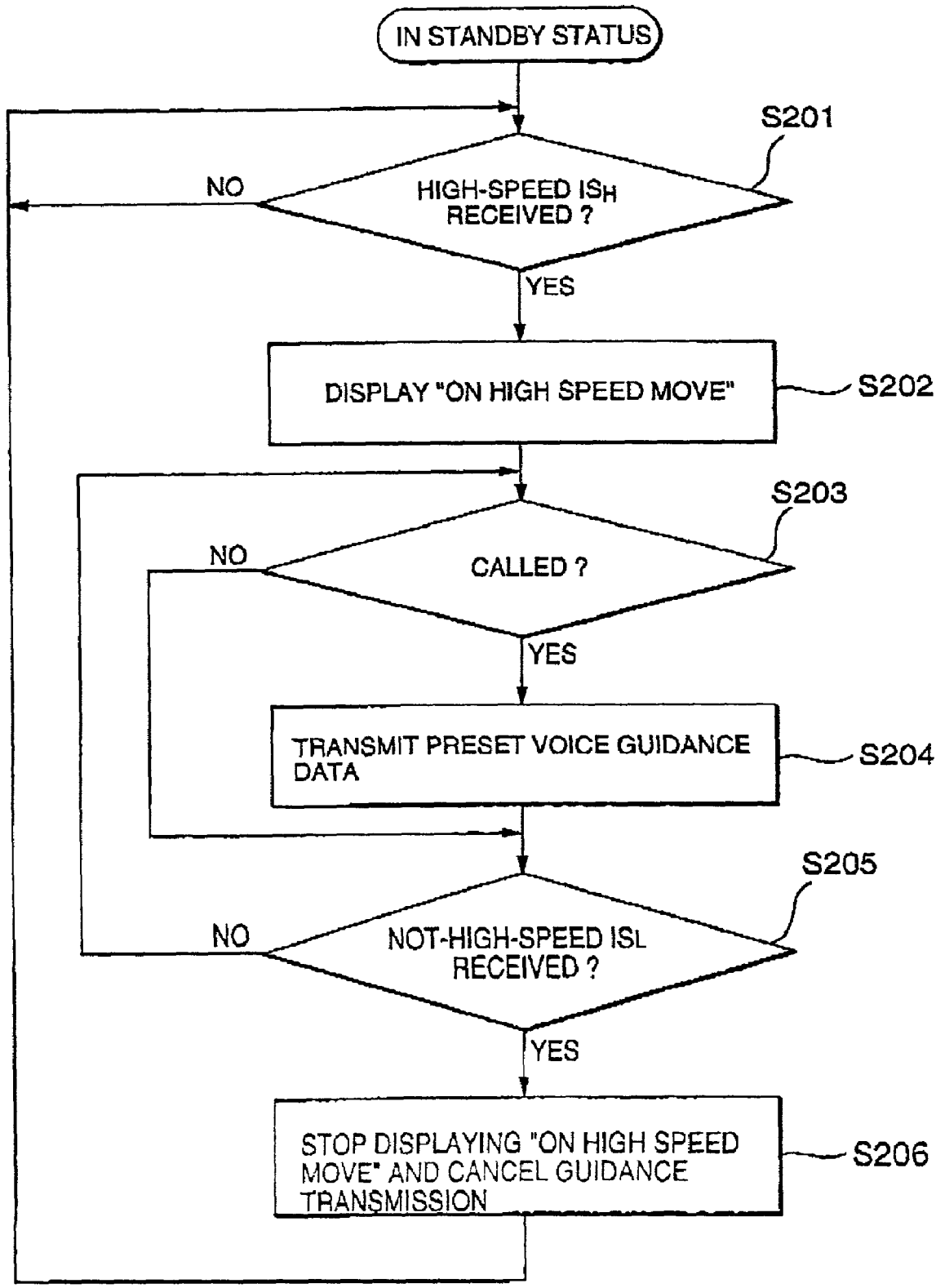
FIG. 3 is a flow chart showing a drive-mode switch operation in the first embodiment.

Referring to FIG. 3, the CPU 13 in standby status determines whether an interrupt occurs (step S201). When the interrupt signal $IS_H$ is generated (YES at step S201), the CPU 13 controls the LCD driver 21 so that a message "on high-speed move" is displayed on the LCD 22 (step S202). Such a message makes the driver aware of setting the mobile telephone to the drive mode in which the ringer is not started but an automatic answering function when an incoming call occurs.

The CPU 13 determines whether an incoming call occurs on the move (step S203). If an incoming call occurs on the move (YES at step S203), the CPU 13 does not make a beep but reads preset voice guidance data from a memory (not shown) and instructs the speech DSP 17 to transmit it to the transmission system (step S204). Accordingly, the preset voice guidance message, for example, "now driving a car", is automatically transmitted to the caller. The CPU 13 sets the mobile telephone to a standby mode by repeatedly performing the steps S203–S204 until the interrupt signal $IS_L$ is generated (NO at step S205).

When the Interrupt signal $IS_L$ is generated (YES at step S205), the CPU 13 stops displaying "On high speed move" on the LCD 22 and cancels the preset voice guidance transmission (step S206). In other words, when the mobile telephone does not move at high speeds, the drive mode is automatically canceled. In this manner, the drive mode is automatically set and reset depending on the interrupt signal generated by the high-speed-movement decision section 16 without driver's attention to the mobile telephone. The high-speed-movement decision section 16 is allowed to be turn on and off depending on a user's instruction through a keypad (not shown).

Figure 4:
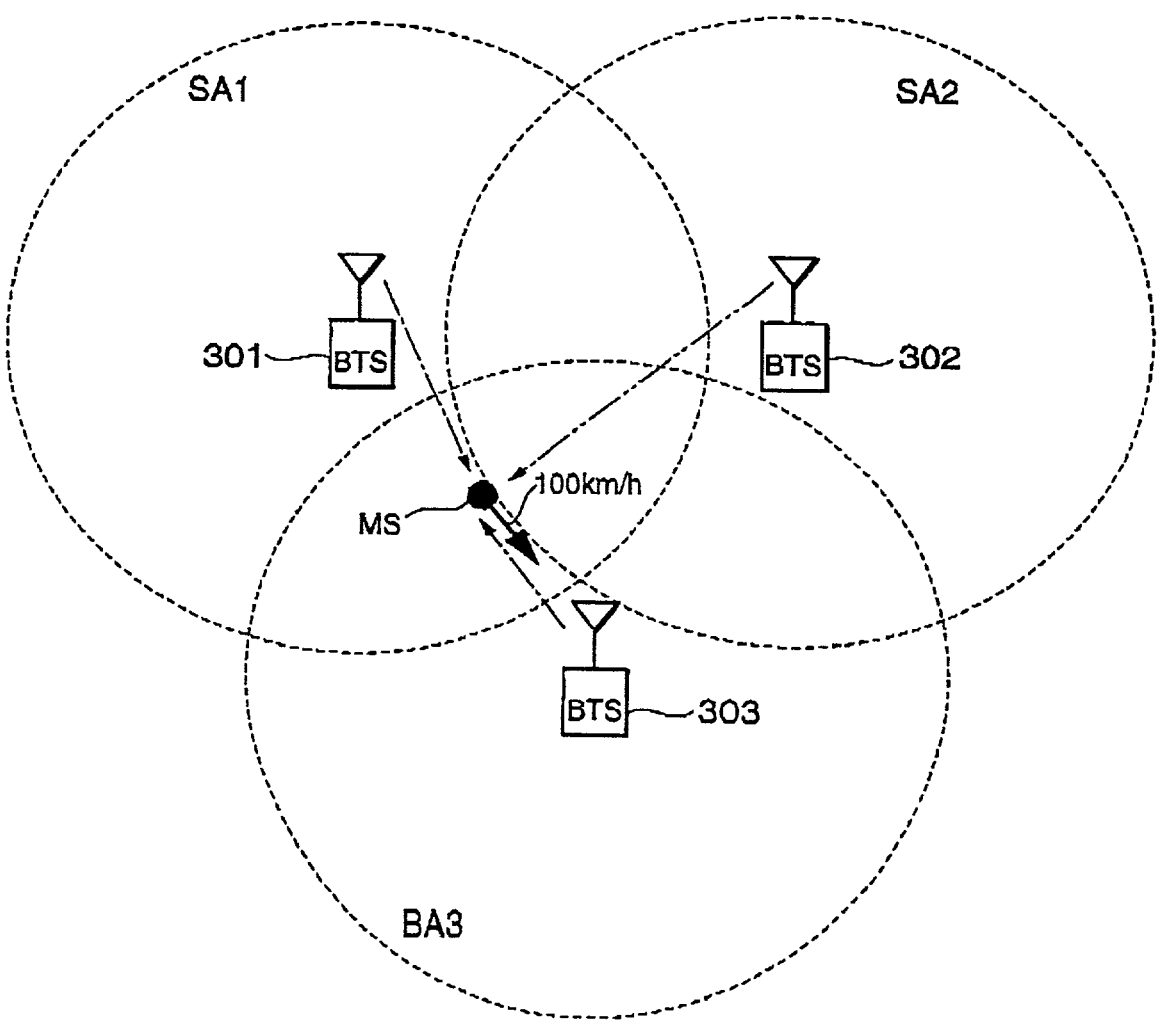
FIG. 4 is a schematic diagram showing an example of a CDMA cellular system for explanation of a fundamental operation of the present invention.

Referring to FIG. 4, it is assumed for simplicity that three base transceiver stations 301–303 forms service areas SA1–SA3 which are in part overlapped with each other and further that a mobile station MS is moving toward the base transceiver station 303 as indicated by an arrow at a constant velocity 100 Km/h while receiving three branches corresponding to the base transceiver stations 301–303.

Assuming that the carrier frequency is 2 GHz, the Doppler frequency $Df_1$ for the base transceiver station 301 is about −185 Hz, $Df_3$ for the base transceiver station 303 Is about +185 Hz, and $Df_2$ for the base transceiver station 302 is almost 0 Hz. In this case, when the predetermined reference set value $f_{REF1}$ is previously set to 100 Hz, the first condition ($Df_1 \times Df_3 < 0$) and the second condition ($|Df_1|=|Df_3|=185$ is greater than $f_{REF1} =100$) are both satisfied. Accordingly, the high-speed-movement decision section 16 generates the interrupt signal $IS_H$ to the CPU 13 and thereby the message indicating that the mobile telephone is on the move is displayed on the LCD 22. Such a message makes the driver aware of setting the mobile telephone to the drive mode. Therefore, when an incoming call occurs on driving, the automatic answering function is automatically set to send the preset voice guidance to the caller.

When the velocity of the mobile telephone is reduced to some extent without changing in direction, $|Df_1|$ and $|Df_3|$ become smaller than $F_{REF1}=100$ and therefore the interrupt signal $IS_L$ is generated (YES at step S205). At this time, the message indicating that the mobile telephone is on the move disappears on the LCD 22 and the automatic answering function becomes inactive. That is, the drive mode is automatically canceled.

The high-speed-movement decision section 16 may be Implemented with software. In other words, the above-described high-speed-movement decision can be realized by only adding a high-speed-movement decision program to the existing control program to run on the CPU 13. Accordingly, the drive mode can be automatically switched on and off without increasing the amount of hardware.

Figure 5:
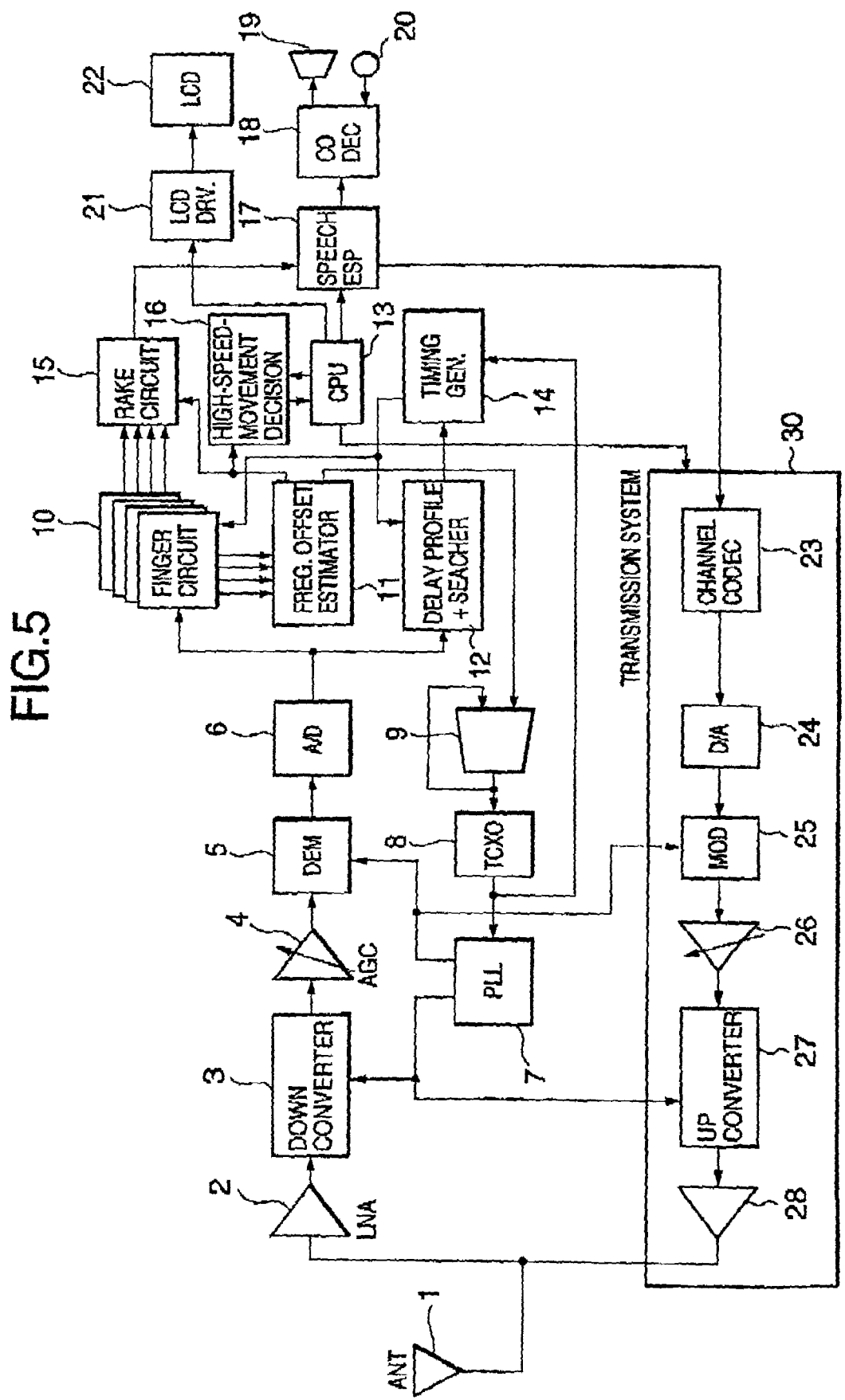
FIG. 5 is a block diagram showing a CDMA mobile telephone according to a second embodiment of the present invention.

Referring to FIG. 5, a second embodiment of the mobile telephone has a function of notifying the network that the mobile telephone is moving at high speeds. Such a notification is performed by the CPU 13 controlling a transmission system 30 including the channel codec 23. When an incoming call occurs after receiving such a notification from the mobile telephone, the network does not call the mobile telephone but sends a preset voice message indicating that the destination terminal is moving at high speeds to the caller. In FIG. 5, circuit blocks similar to those previously described with reference to FIG. 1 are denoted by the same reference numerals and the descriptions are omitted. Hereafter, the high-speed-movement decision method will be described in detail.

Referring to FIG. 6, the high-speed-movement decision section 16 inputs N frequency offsets $\Delta f_1$–$\Delta f_N$ each corresponding to N fingers from the frequency offset estimator 11 (step S401). Thereafter, the high-speed-movement decision section 16 calculates branch frequency offsets $\Delta Bf_1$–$\Delta Bf_M$ for respective ones of the receiving branches by combining the frequency offsets $\Delta f_1$–$\Delta f_N$ which are weighted for respective ones of receiving branches taking into account an electric field level, a signal-to-noise ratio and the like of a received signal (step S402).

Subsequently, it is determined whether there is a branch frequency offset $Bf_1$ satisfying that the absolute value of $\Delta Bf_j$ is greater than a predetermined reference set value $f_{REF2}$, that is, $|\Delta Bf_i| > f_{REF2}$ (step S403).

When such a branch frequency offset $\Delta Bf_1$ is found (YES at step S403). It is further determined whether there is at least one branch frequency offset $\Delta Bf_j$ satisfying that the absolute value of $\Delta Bf_j$ is equal to or smaller than the maximum AFC correction threshold $L_{AFC}$, that is, $|\Delta Bf_1| \leq L_{AFC}$ (step S404). If at least one branch frequency offset $\Delta Bf_j$ satisfying the condition is found (YES at step S404), then the high-speed-movement decision section 16 generates an interrupt signal $IS_H$ to the CPU 13 to indicate that the mobile telephone is on the move (step S405).

If no branch frequency offset $Bf_i$ satisfying $|\Delta Bf_i|>f_{REF2}$ is found (NO at step S403) or if no branch frequency offset $\Delta Bf_j$ satisfying $|\Delta Bf_j| L_{AFC}$ found (NO at step S404), then the high-speed-movement decision section 16 generates an interrupt signal $IS_L$ to the CPU 13 to Indicate that the mobile telephone stops or-does not move at high speeds (step S406).

Referring to FIG. 7, the CPU 13 in standby status determines whether an interrupt occurs (step S501). When the high-speed-movement interrupt signal $IS_H$ is generated (YES at step S501), the CPU 13 controls the transmission system 30 such that a message indicating that the mobile telephone is moving at high speeds is transmitted to the network (step S502). Such a message may be displayed on the LCD 22 to make the driver aware of setting the mobile telephone to the drive mode. Thereafter, the CPU 13 returns to the standby status (step S503) and sets the mobile telephone to the standby mode until the not-movement interrupt signal $IS_L$ Is generated (NO at step S504).

When the interrupt signal $IS_L$ is generated (YES at step S504), the CPU 13 controls the transmission system 30 such that a message indicating that the mobile telephone does not move at high speeds is transmitted to the network (step S505). Such a message may be displayed on the LCD 22 to make the driver aware of resetting the drive mode Thereafter, control goes back to the step S501.

In the case where an incoming call to the mobile telephone occurs after receiving the high-speed-movement notification from the mobile telephone, the network starts a voice mail system to send the caller a preset voice message indicating that the destination terminal is moving at high speeds. When receiving the not-movement notification from the mobile telephone, the network resets the voice mail system and returns to the normal call processing operation. Since the automatic answering function is provided in the network side In the second embodiment, the amount of hardware in the mobile telephone is further reduced.

In this manner, the drive mode is automatically set and canceled depending on an interrupt signal generated by the high-speed-movement decision section 16 without driver's attention to the mobile telephone. The high-speed-movement decision section 16 is allowed to be turn on and off depending on a user's instruction through a keypad (not shown).

In the above-described case as shown in FIG. 4, it is assumed that the base transceiver station 303 is selected as a main branch and the AFC operation is performed by weighting the main branch at a rate of approximately 100%. In this case, the branch frequency offset $\Delta Bf_3$ for the base transceiver station 303 is almost 0 Hz and the branch frequency offset $\Delta Bf_1$ for the base transceiver station 301 is almost −370 Hz. Therefore, in the case of the predetermined reference set value $f_{REF2}$ being set to 300 Hz, $|\Delta Bf_1|>f_{REF2}$ (YES at step S403) and $|\Delta Bf_3|<L_{AFC}$ (YES at step S404) Since both conditions are satisfied, the high-speed-movement decision section 16 generates an interrupt signal $IS_H$ to the CPU 13 to indicate that the mobile telephone is on the move (step S405).

When the high-speed-movement interrupt signal $IS_H$ is generated, the CPU 13 set the mobile telephone to the drive mode and the notification indicating that the mobile telephone is moving at high speeds is transmitted to the network. In this status, when an incoming call occurs, the network sends a voice message having the same contents to the caller.

On the other hand, when the velocity of the mobile telephone is reduced to some extent without changing in direction, $|\Delta Bf_1|$ become smaller than $f_{REF2}=300$ and therefore the interrupt signal $IS_L$ is generated, resulting in the drive mode being automatically canceled.

As described above, when the user is driving a car and moving at high speeds, the mobile telephone is automatically set to the drive mode. When the user stops the car or reduces speed to below a predetermined velocity, the mobile telephone is automatically reset to the normal operation mode. Since a preset message is displayed on the LCD, the user is aware of setting the mobile telephone to the drive mode. Further, when an incoming call occurs on driving, a preset voice message is automatically sent from the network to the caller. Therefore, the caller is aware of the destination telephone moving at high speeds.

The high-speed-movement decision method as shown in FIG. 2 may be combined with the operation of the CPU 13 as shown in FIG. 7. Contrarily, the high-speed-movement decision method as shown in FIG. 6 may be combined with the operation of the CPU 13 as shown in FIG. 3.

The invention claimed is:

1. A mobile telephone apparatus operable in a CDMA (code division multiple access) communications system, comprising:
    a despreading circuit for despreading received spectrum-spread data of a plurality of branches to produce despread data each corresponding a plurality of fingers;
    a frequency offset detector for detecting a frequency offset for each of the fingers from the despread data,
    a movement determiner for determining whether the mobile telephone is moving at speeds higher than a predetermined speed, based on frequency offsets received from the frequency offset detector; and
    a control means for switching an operation mode between a drive mode and a normal mode depending on whether the mobile telephone apparatus is moving at speeds higher than the predetermined speed.

2. The mobile telephone apparatus according to claim 1, wherein the movement determiner comprises:
    a Doppler frequency calculator for calculating Doppler frequencies for respective ones of the branches by combining the frequency offsets for respective ones of the fingers;
    a first determiner for determining whether there is a pair of Doppler frequencies satisfying a first condition such that the Doppler frequencies are of opposite sign;
    a second determiner for determining whether the Doppler frequencies satisfy a second condition such that an absolute value of each of the Doppler frequencies is not smaller than a first reference value; and
    a determination controller for determining that the mobile telephone apparatus is moving at speeds higher than the predetermined speed when a pair of Doppler frequencies satisfying the first and second conditions exists.

3. The mobile telephone apparatus according to claim 2, wherein the determination controller outputs a first interrupt signal to the mode controller when the pair of Doppler frequencies satisfying the first and second conditions exist and outputs a second interrupt signal to the mode controller when a pair of Doppler frequencies satisfying the first and second conditions does not exist,
    wherein the mode controller sets the mobile telephone apparatus to the drive mode when receiving the first interrupt signal and sets the mobile telephone apparatus to the normal mode when receiving the second interrupt signal.

4. The mobile telephone apparatus according to claim 1, wherein the movement determiner comprises:
   a branch frequency offset calculator for calculating branch frequency offsets for respective ones of the branches by combining the frequency offsets for respective ones of the fingers;
   a first determiner for determining whether there is a branch frequency offset satisfying a first condition such that an absolute value of the branch frequency offset is greater than a second reference value;
   a second determiner for determining whether there is at least one branch frequency offset satisfying a second condition such that an absolute value of the branch frequency offset is not greater than a maximum correction threshold of AFC (automatic frequency control) operation performed in the mobile telephone apparatus; and
   a determination controller for determining that the mobile telephone apparatus is moving at speeds higher than the predetermined speed when there are both the branch frequency offset satisfying the first condition and the at least one branch frequency offset satisfying the second condition.

5. The mobile telephone apparatus according to claim 4, wherein the determination controller outputs a first interrupt signal to the mode controller when there are both the branch frequency offset satisfying the first condition and the at least one branch frequency offset satisfying the second condition, and outputs a second interrupt signal to the mode controller when there is neither the branch frequency offset satisfying the first condition nor the at least one branch frequency offset satisfying the second condition,
   wherein the mode controller sets the mobile telephone apparatus to the drive mode when receiving the first interrupt signal and sets the mobile telephone apparatus to the normal mode when receiving the second interrupt signal.

6. The mobile telephone apparatus according to claim 1, further comprising:
   a display controller for controlling a display device when the mobile telephone apparatus is moving at speeds higher than the predetermined speed such that a message indicating that the mobile telephone apparatus is moving at speeds higher than the predetermined speed is displayed on the display device.

7. The mobile telephone apparatus according to claim 1, further comprising:
   a voice message generator for generating a predetermined voice message when an incoming call occurs during the drive mode: and
   a communication controller for transmitting the predetermined voice message to a caller.

8. The mobile telephone apparatus according to claim 6, further comprising:
   a voice message generator for generating a predetermined voice message when an incoming call occurs during the drive mode; and
   a communication controller for transmitting the predetermined voice message to a caller.

9. The mobile telephone apparatus according to claim 1, further comprising:
   a communication controller for transmitting a network system a drive mode message indicating that the mobile telephone apparatus is moving at speeds higher than the predetermined speed, when the operation mode has been changed to the drive mode,
   wherein the network system has a voice message system in which, when an incoming call occurs after having received the drive-mode message from the mobile telephone apparatus, the voice message system transmits a predetermined voice message to a caller.

10. The mobile telephone apparatus according to claim 6, further comprising:
    a communication controller for transmitting a network system a drive mode message indicating that the mobile telephone apparatus is moving at speeds higher than the predetermined speed, when the operation mode has been changed to the drive mode,
    wherein the network system has a voice message system in which, when an incoming call occurs after having received the drive-mode message from the mobile telephone apparatus, the voice message system transmits a predetermined voice message to a caller.

11. A method for detecting movement of a mobile telephone which is operable in a CDMA (code division multiple access) communications system, comprising the steps of:
    a) detecting a frequency offset for each of N fingers from despread data which are obtained by despreading received spectrum-spread data of M branches, wherein N and M are integers greater than 1; and
    b) determining whether the mobile telephone is moving at speeds higher than a predetermined speed, based on N frequency offsets detected by the step (a); and
    (c) switching an operation mode between a drive mode and a normal mode depending on whether the mobile telephone is moving at speeds higher than said predetermined speed, as determined in step (b).

12. The method according to claim 11 wherein the step (b) comprises the steps of:
    calculating M Doppler frequencies for respective ones of the M branches by combining the N frequency offsets for respective ones of the N fingers;
    determining whether there is a pair of M Doppler frequencies, $Df_i$ and $Df_j$, satisfying $Df_i \times Df_j < 0$, wherein $i$ and $j$ are an integer greater than 0;
    determining whether the Doppler frequencies $Df_i$ and $Df_j$ satisfy a second condition such that an absolute value of each of the Doppler frequencies $Df_i$ and $Df_j$, is not smaller than a first reference value; and
    determining that the mobile telephone is moving at speeds higher than the predetermined speed when a pair of Doppler frequencies satisfying the first and second conditions exists.

13. The method according to claim 11, wherein the step (b) comprises the steps of:
    calculating M branch frequency offsets for respective ones of the M branches by combining the N frequency offsets for respective ones of the N fingers;
    determining whether there is a branch frequency offset satisfying a first condition such that an absolute value of the branch frequency offset is greater than a second reference value;
    determining whether there is at least one branch frequency offset satisfying a second condition such that an absolute value of the branch frequency offset is not greater than a maximum correction threshold of AFC (automatic frequency control) operation performed in the mobile telephone apparatus; and
    determining that the mobile telephone apparatus is moving at speeds higher than the predetermined speed when there are both the branch frequency offset satisfying the first condition and the at least one branch frequency offset satisfying the second condition.

14. The method according to claim 11, further comprising a step of:

displaying a message when the mobile telephone is moving at speeds higher than the predetermined speed.

15. The method according to claim 11, further comprising steps of:

generating a predetermined voice message when an incoming call occurs during the drive mode; and transmitting the predetermined voice message to a caller.

16. The method according to claim 11, further comprising steps of:

transmitting to a network system a drive-mode message indicating that the mobile telephone is moving at speeds higher than the predetermined speed, when the operation mode has been changed to the drive mode, wherein the network system has a voice message system in which, when an incoming call occurs after having received the drive-mode message from the mobile telephone, the voice message system transmits a predetermined voice message to a caller.

* * * * *